(12) United States Patent
Prevey et al.

(10) Patent No.: US 9,283,650 B2
(45) Date of Patent: Mar. 15, 2016

(54) BURNISHING TOOL AND METHOD FOR BURNISHING

(71) Applicant: Surface Technology Holdings, Ltd., Cincinnati, OH (US)

(72) Inventors: Michael Prevey, Cincinnati, OH (US); Paul S. Prevey, III, Cincinnati, OH (US)

(73) Assignee: Sunface Technology Holdings, Ltd., Cincinnati, OH (US)

( * ) Notice: Subject to any disclaimer, the term of this patent is extended or adjusted under 35 U.S.C. 154(b) by 313 days.

(21) Appl. No.: 14/069,449

(22) Filed: Nov. 1, 2013

(65) Prior Publication Data

US 2014/0130321 A1    May 15, 2014

Related U.S. Application Data

(62) Division of application No. 12/931,811, filed on Feb. 10, 2011, now Pat. No. 8,601,659.

(51) Int. Cl.
| | |
|---|---|
| *B24B 39/00* | (2006.01) |
| *B23P 9/00* | (2006.01) |
| *B23P 9/02* | (2006.01) |
| *C21D 7/08* | (2006.01) |

(52) U.S. Cl.
CPC . *B24B 39/00* (2013.01); *B23P 9/02* (2013.01); *B24B 39/003* (2013.01); *C21D 7/08* (2013.01); *Y10T 29/47* (2015.01); *Y10T 29/474* (2015.01); *Y10T 29/49776* (2015.01)

(58) Field of Classification Search
CPC ......... B23P 9/02; B24B 39/00; B24B 39/003; B24B 39/04; C21D 7/08; Y10T 29/49776; Y10T 29/474; Y10T 29/47
See application file for complete search history.

(56) References Cited

U.S. PATENT DOCUMENTS

| | | | |
|---|---|---|---|
| 1,171,146 | A | 2/1916 | Scribner |
| 2,797,602 | A | 7/1957 | Atherholt et al. |
| 3,494,013 | A | 2/1970 | Gottschald |
| 4,565,081 | A | 1/1986 | Massee |
| 4,947,668 | A | 8/1990 | Ostertag |
| 5,099,558 | A | 3/1992 | Wilson |
| 5,152,628 | A | 10/1992 | Broszat |
| 5,188,477 | A | 2/1993 | Idosako |
| 5,509,748 | A | 4/1996 | Idosako |
| 5,568,983 | A | 10/1996 | Wilson |
| 5,641,235 | A | 6/1997 | Maughan |
| 5,813,077 | A | 9/1998 | Belanger |
| 5,826,453 | A | 10/1998 | Prevey, III |
| 6,415,486 | B1 | 7/2002 | Prevey, III |

(Continued)

FOREIGN PATENT DOCUMENTS

EP        1426139        6/2004

OTHER PUBLICATIONS

USPTO Office Action dated Mar. 7, 2013, for U.S. Appl. No. 12/931,811, filed Feb. 10, 2011.

*Primary Examiner* — Alexander P Taousakis
(74) *Attorney, Agent, or Firm* — Mark F. Smith; Smith Brandenburg Ltd

(57) ABSTRACT

A method for providing a surface treatment along the surface of a work piece, using a burnishing tool having a tool head comprising a bearing for supporting a rolling element and an encasement for supporting the bearing. The bearing is formed from a polymer or polymer resin such as, but not limited to, polytetrafluoroethylene based resin, ultra-high-molecular-weight polyethylene based resin.

20 Claims, 15 Drawing Sheets

(56) References Cited

U.S. PATENT DOCUMENTS

| | | |
|---|---|---|
| 6,461,679 B1 | 10/2002 | McMeekin et al. |
| 6,622,570 B1 | 9/2003 | Prevey, III |
| 7,014,368 B2 | 3/2006 | Morita et al. |
| 7,116,095 B2 | 10/2006 | Takizawa |
| 7,600,404 B2 | 10/2009 | Prevey, III |
| 8,375,805 B2 | 2/2013 | Prevey |
| 2003/0091253 A1 | 5/2003 | Morita et al. |
| 2005/0031239 A1 | 2/2005 | Aoki et al. |
| 2005/0155203 A1 | 7/2005 | Prevey |
| 2008/0081208 A1* | 4/2008 | Prevey .............. C21D 7/06 428/610 |
| 2013/0313755 A1* | 11/2013 | Gegner .............. B23P 9/02 264/340 |
| 2015/0128392 A1* | 5/2015 | Talhami .............. B24B 39/04 29/90.5 |

* cited by examiner

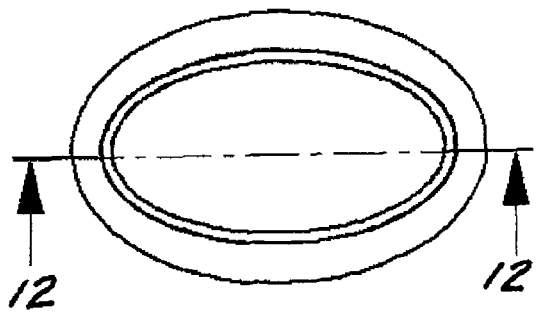
FIG. 11
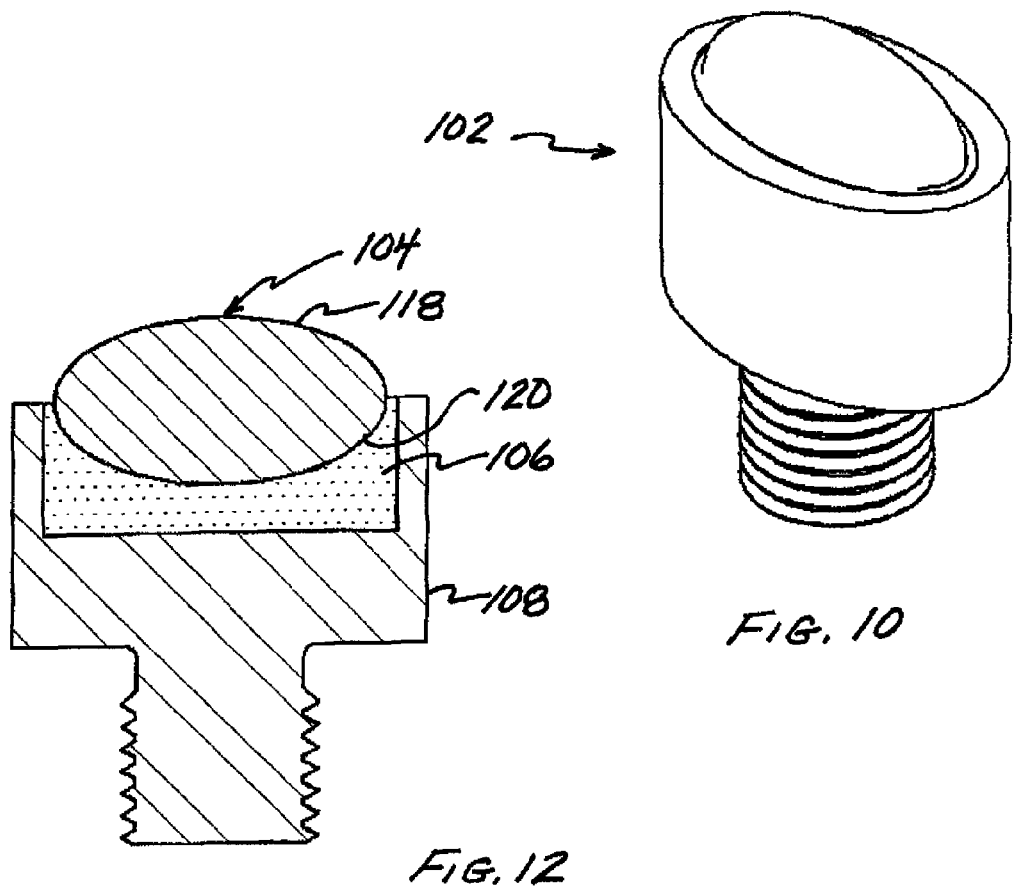
FIG. 10
FIG. 12

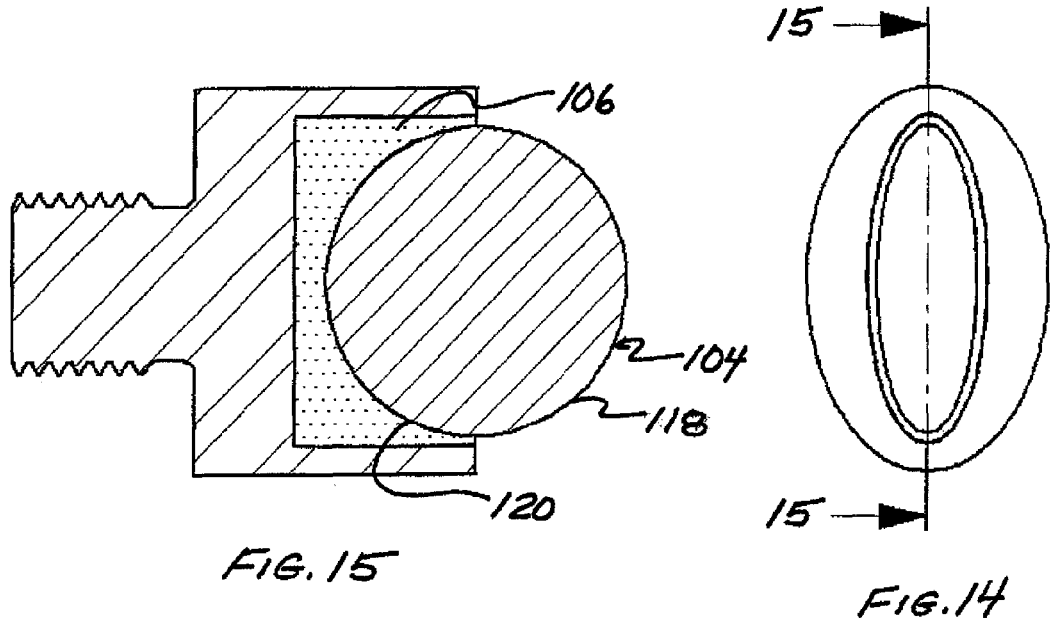
FIG. 15
FIG. 14
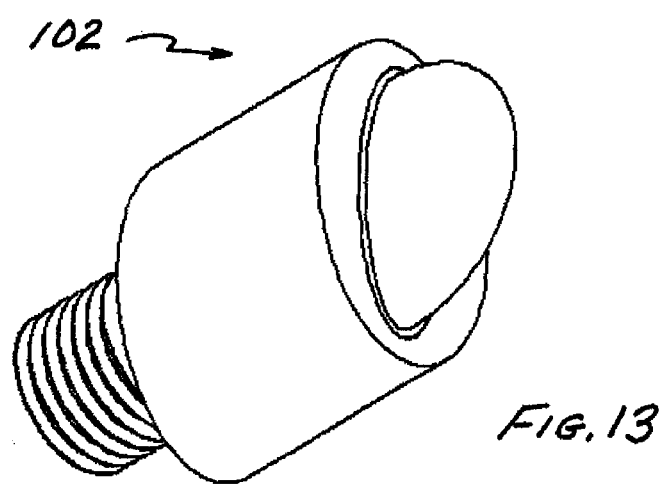
FIG. 13

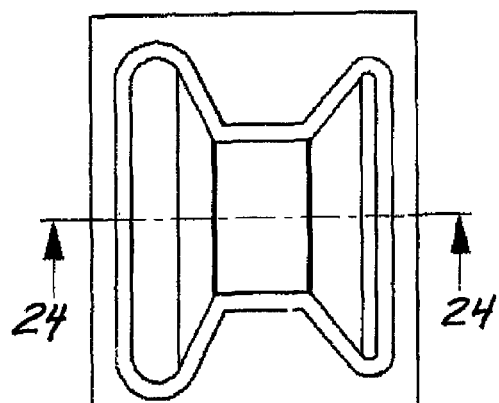
FIG. 23
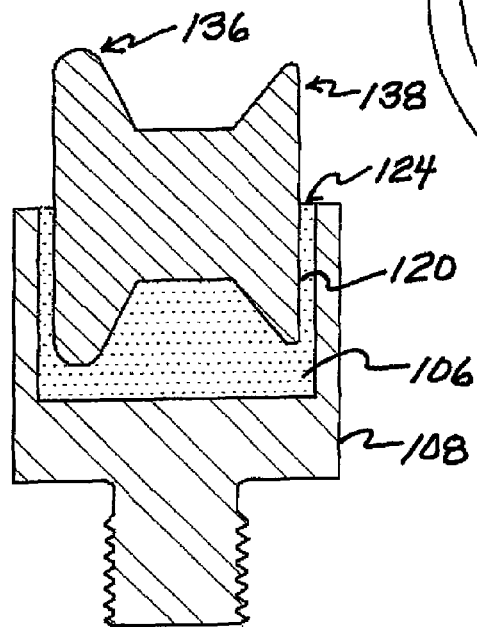
FIG. 22
FIG. 24

BURNISHING TOOL AND METHOD FOR BURNISHING

CROSS REFERENCE TO PRIOR APPLICATION

This application is a divisional patent application of U.S. patent application Ser. No. 12/931,811, filed Feb. 10, 2011.

BACKGROUND OF THE INVENTION

The subject invention is directed to burnishing tools and methods for burnishing a work piece and more particularly, to new and novel burnishing tools and methods whereby a burnishing tool comprises a tool head having a law friction polymer support bearing.

Ball, wheel, and roller burnishing tools with actively rolling elements are well known, and have been widely used for decades for surface finishing and sizing of metallic articles. Ball and roller burnishing is generally performed in a machine tool, often a lathe, as a final machining operation.

For the purpose of improving the surface finish of a work piece, a rolling element is pressed against the surface of a work piece with sufficient force to plastically deform the high points and asperities or "tooling marks" left from prior machining or grinding. Using a suitable high-hardness rolling element and the appropriate force for the work piece material, elimination of the tooling marks can leave a near mirror finish limited only by the finish of the rolling element. For uniform finishing, the rolling element is pressed against the work piece surface by spring or hydraulic means in a controlled manner.

For precise sizing of a work piece, the rolling element is forced against the surface so that the work piece is deformed slightly to conform to a precise desired dimension. Small reductions in work piece dimensions can be achieved so that the final dimensions conform to tight tolerances. For example, an accurate slip-fit of a piston to a cylinder can be controlled in production using roller burnishing of the cylinder bore and piston diameter. For accurate sizing, the burnishing process is commonly controlled by the interference fit of the work piece with a fixed dimension by the tool's rigidly fixed geometry, so that the finished dimension, and not the burnishing force, is held constant.

Burnishing is a practical and economical means of extending the service life of aircraft, engines, steam and gas turbines, and virtually any component subject to fatigue or stress corrosion cracking (SCC). For surface enhancement, the force with which the rolling element is applied to the surface must be controlled and be sufficient to deform the work piece, thus creating the magnitude and depth of compression desired. Burnishing can also be used to improve the fatigue and stress corrosion cracking resistance of existing components without changing either the material (alloy and heat treatment) or the design (physical dimensions) of components. Processes such as "low plasticity burnishing" described in U.S. Pat. No. 5,826,453, and "deep rolling burnishing" described in U.S. Pat. No. 4,947,668 have been developed to impart a layer of compressive residual stress, with minimal or high amounts of plastic deformation, respectively. Both processes provide compressive residual stress within the surface of a work piece, resulting from a combination of subsurface deformation by Hertzian loading of the rolling element against the surface, and the lateral expansion of the surface by the burnishing tool. Such compressive residual stress operates to retard fatigue crack initiation and propagation, and mitigates stress corrosion cracking by eliminating the necessary tension at the surface.

Burnishing tools used for inducing compressive residual stress in a work piece typically have tool heads comprising of one or more rolling elements supported by either an axel-bearing support or hydrostatic bearings. Axel-bearing tools have wheels or rollers affixed to an axel supported by conventional ball, roller, needle, or simple bronze bearings, with the rim of the wheel contacting the work piece. The multiple cylindrical and conical roller tools commonly used for sizing and finishing use an inner race or shaft to support the rollers retained in a cage. Unfortunately, such tools are bulky, limiting access to the work piece, suffer from continual wear, and develop heat in operation that can limit the speed of burnishing and the tool life.

Burnishing tools have also been developed that have tool heads with hydrostatic bearings to support the rolling element. Ball and roller burnishing using hydrostatic tools provide deep residual compression for surface enhancement to improve fatigue, stress corrosion cracking, and general corrosion performance in a wide variety of applications. Surface enhancement offers great potential for improvements in safety and reduction in the cost of maintenance and repair. Fatigue and stress corrosion cracking can be mitigated in aluminum aircraft structures, landing gear, nuclear components and radioactive waste storage containers, oil and gas drilling and distribution piping, for example.

One such burnishing tool is described in U.S. Pat. No. 4,947,668 which uses a constant pressure hydrostatic bearing in which the burnishing force is controlled by the fluid pressure that also operates to support a rolling element. Other such burnishing tools are described in U.S. Pat. Nos. 5,826,453 and 6,415,486. Such burnishing tools as described above have tool heads containing a hydrostatic bearing that utilizes fluid flow to support the rolling element, and to project outwardly from the tool head to lubricate the rolling element. This fluid can also operate as a coolant as the rolling element contacts and rolls along the surface of a work piece. In such systems, the force of burnishing is controlled by separate hydraulic or other mechanical means. Unfortunately, such burnishing tools must be continuously connected to systems providing a source of the pressurized fluid for supporting and for extending the rolling element outwardly from the tool head. Recovery of the hydrostatic fluid as it is expelled under pressure from the burnishing tool either limits the tool to closed machine tool applications, or requires further complexity by requiring a means of fluid recovery. Hydrostatic bearing tools also have a limited angular range over which the force can be applied to the rolling element. If the processing force is applied to the rolling element at more than a few degrees from the axis of the bearing, the lateral resultant force displaces the fluid separating and extending the rolling element outwardly from the bearing seat. This often results in excessive wear that limits the life of the rolling element. Therefore, hydrostatic bearing tools must be maintained in an alignment nearly normal to the surface of the work piece during the burnishing operation, thereby limiting the range of potential applications.

SUMMARY OF THE INVENTION

The present invention is a new and novel burnishing tool and method of burnishing. The burnishing tool comprises a polymer, "plastic", or polymeric bearing for supporting one or more rolling elements incorporated within a tool head.

In a preferred embodiment of the invention, the bearing is formed from polytetrafluoroethylene (PTFE) based resin.

In another preferred embodiment of the invention, the bearing is formed from an ultra-high-molecular-weight polyethylene (UHMWPE or UHMW) based resin.

In another preferred embodiment of the invention, the bearing is formed from a thermoplastic material.

In another preferred embodiment of the invention, the bearing is formed from a chemically inert material.

In a preferred embodiment of the invention, the rolling element is a spherical shaped rolling element.

In another preferred embodiment of the invention, the rolling element is a conical shaped rolling element.

In another preferred embodiment of the invention, the rolling element is a cylindrical shaped rolling element.

In another preferred embodiment of the invention, the rolling element is that of an elliptical solid of revolution with the semimajor axis aligned parallel to the work piece surface.

In another preferred embodiment of the invention, the rolling element is in the shape of an elliptical solid of revolution with the semiminor axis aligned parallel to the work piece surface.

In a preferred embodiment of the invention, the tool head includes an encasement designed to increase the constraint on the bearing as the processing load increases.

In a preferred embodiment of the invention, at least a portion of the bearing is supported by an encasement such that it prevents or minimizes plastic deformation and/or creep of the material forming the bearing when loads exceed the yield stress of the bearing material during use of the burnishing tool.

In a preferred embodiment of the invention, the rolling element includes a narrow wheel and axel to increase the surface area in contact with the bearing.

In another preferred embodiment of the invention, the burnishing tool further comprises a control system effective for controlling the burnishing operation.

In another preferred embodiment of the invention, the burnishing tool further comprises using a control system to control the burnishing force being applied along the surface of the work piece.

In another preferred embodiment of the invention, the burnishing tool further comprises a control system to control the direction and path of the rolling element across the surface of the work piece.

In another preferred embodiment of the invention, the burnishing tool further comprises a warning signal for warning the operator if the rolling element seizes or begins to seize during use.

Another aspect of this invention is a method of burnishing the surface of a work piece using a burnishing tool having one or more rolling elements each supported by a polymer bearing for supporting the rolling element.

In another preferred embodiment of the invention, the method further comprises the step of pressing one or more rolling elements against the surface of a work piece without the use of a pressurized fluid to support the rolling element.

In another preferred embodiment of the invention, the method further comprises the step of using a computerized control system to control the burnishing process.

In another preferred embodiment of the invention the method further comprises the step of using a computerized control system to control the burnishing force being applied along the surface of the work piece.

In another preferred embodiment of the invention the method further comprises the step of using a computerized control system to control the direction and path of the rolling element across the surface of the work piece.

In another preferred embodiment of the invention the method further comprises the step of providing a warning signal if the rolling element seizes or begins to seize during use.

Other embodiments and advantages of the invention will be apparent from the following description, the accompanying drawings and the appended claims.

BRIEF DESCRIPTION OF THE DRAWINGS

To provide a more complete understanding of the present invention and further features and advantages thereof, reference is now made to the following description taken in conjunction with the accompanying drawings, in which:

FIG. 10 is a schematic perspective illustration of another preferred embodiment of a tool head of the burnishing tool of the subject invention showing the rolling element having a shape of an elliptical solid of revolution with the semimajor axis of rotation aligned parallel to the surface of the work piece;

FIG. 11 is a top schematic view of the tool head of FIG. 10;

FIG. 12 is a schematic cross-sectional view of the tool head of FIG. 10;

FIG. 13 is a schematic perspective illustration of another preferred embodiment of a tool head of the burnishing tool of the subject invention showing a rolling element having a shape of an elliptical solid of revolution with the semiminor axis aligned parallel to the work piece surface;

FIG. 14 is a top schematic view of the tool head of FIG. 13;

FIG. 15 is a schematic cross-sectional view of the tool head of FIG. 13 showing the rolling element having a shape of an elliptical solid of revolution with the semiminor axis aligned parallel to the work piece surface;

FIG. 22 is a schematic perspective illustration of a preferred embodiment of a tool head showing a rolling element in the form of a solid of revolution having two different radii for burnishing different fillet sizes without changing tool heads;

FIG. 23 is a top schematic view of the tool head of FIG. 22;

FIG. 24 is a side schematic cross-sectional view of the tool head of FIG. 22;

DETAILED DESCRIPTION OF THE INVENTION

The present invention is a new and unique burnishing tool and method having a tool head comprising a rolling element, such as a roller or ball, supported by a bearing positioned within an outer relatively rigid encasement. The bearing is formed from a low friction polymer based bearing material, such as polytetrafluoroethylene (PTFE) based resins; or a ultra-high-molecular-weight polyethylene (UHMWPE or UHMW), also known as high-modulus polyethylene (HMPE); or high-performance polyethylene (HPPE); or another polymer material that provides a low coefficient of friction and is resistant to abrasion such that it is effective for supporting the rolling element.

It should now be understood that while polymer "plastic" bearings have been used for rotating shafts, linear bearings and similar applications. Such polymer bearings have not been used in burnishing tools for supporting rolling elements because of the limited compressive strength of the polymers used to form the bearings. It has been found, however, that when constructed in the manner of the present invention, the burnishing tools can operate and sustain the higher loads required by burnishing tools such as those used for inducing compressive residual stress along and in the surface of a work piece. Accordingly, it has been found that tool heads and corresponding rolling elements can be made smaller for a given task than either hydrostatic or mechanical bearing tools, allowing greater access for processing. Further, by eliminating the need for pressurized fluid flows for supporting and extending the rolling element outwardly from the tool head, additional advantages relating to cost, surface cleanliness, freezing/evaporation of the fluid, and the size, weight and complexity of the supporting components can be realized.

Although the invention described herein is described in some detail for purposes of clarity of understanding, it will be apparent that certain changes and modification may be practiced within the scope of the appended claims. Accordingly, it should be understood that the present disclosure various embodiments are to be considered as exemplary of the principles of the invention, and is not intended to limit the invention to such embodiments and the specific examples illustrated, and the invention is not to be limited to the details given herein, but may be modified within the scope and equivalents of the descriptions and examples contained herein.

Figure 1:
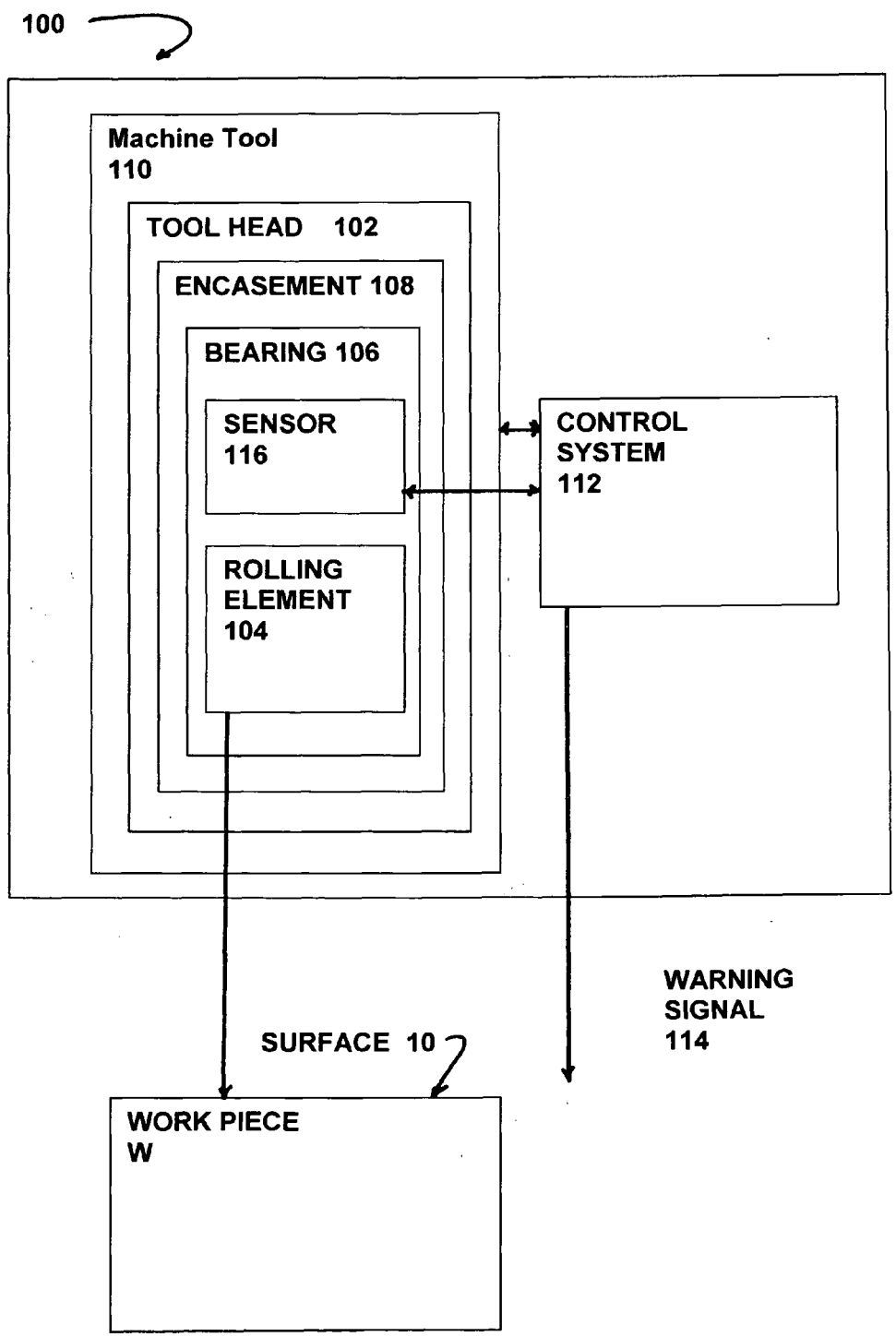
FIG. 1 is a schematic illustration showing the relationship of the various components of the burnishing tool of the subject invention.
Figure 26:
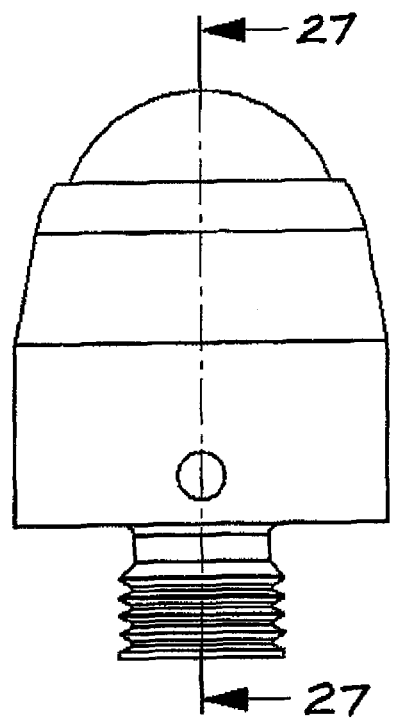
FIG. 26 is a schematic side view of the tool head of FIG. 25.
Figure 27:
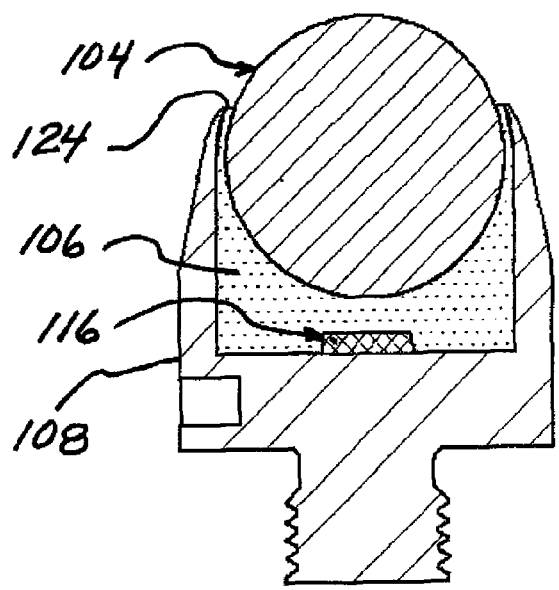
FIG. 27 is a side cross-sectional view of the tool head of FIG. 25.
Figure 25:
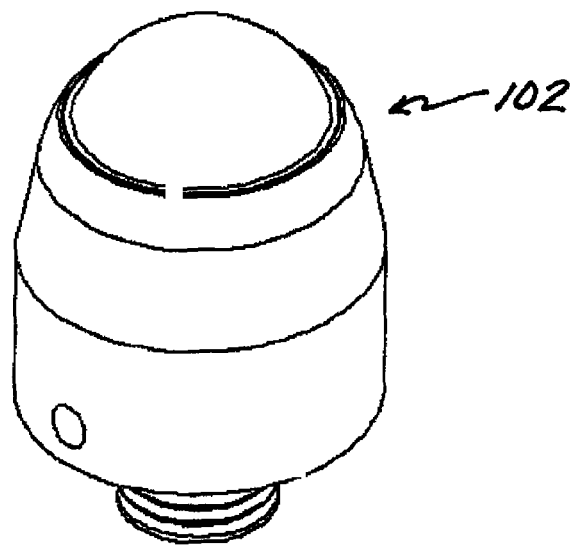
FIG. 25 is a schematic perspective illustration of another preferred embodiment of a tool head showing a force sensor installed within the encasement which is coupled to the bearing and the control system for measuring the force being applied to the work piece.

Referring to FIG. 1, a schematic illustration of the burnishing tool 100 of the subject invention is shown comprising a tool head 102 having a rolling element 104 rotatably supported by a bearing 106 which is blanketed or confined by an outer encasement 108. The burnishing tool 100 includes a machine tool 110 which is coupled to the tool head 102 for directing the tool head 102 across the surface of a work piece W during the burnishing operation for providing a surface treatment to a work piece W such as, but not limited to, inducing compressive residual stress along and into the surface of a work piece W. In a preferred embodiment of the invention, the burnishing tool 100 further comprises a control system 112, such as a computerized control system or a convention system such as a CNC control system, which is coupled to the machine tool 110 for directing the burnishing operation. In another preferred embodiment of the invention, the burnishing tool 100 also includes a warning signal 114 for providing a warning when the rolling element 104 seizes or begins to seize during use or when the bearing 106 is worn down by a specified amount. Such a warning signal can be coupled to the control system 112 that calculates the location of the tool head 102 relative to the surface of the work piece W (or if an increase of force is necessary to move the rolling element across the surface of the work piece). This signal can be used to determine when possible seizing of the rolling element 104 may occur or if the bearing 106 has worn down by a specified amount. In another preferred embodiment, the warning signal is a sensor 116 (FIGS. 25-27) embedded in bearing 106 which is coupled to the warning signal 114 of the control system 112 (FIG. 1), and senses if the bearing has eroded to a specified level thereby signaling for replacement of the tool head 102 or bearing 104. It should also now be apparent that the sensor 116 can also be in the form of a "squeeler" that generates a noise to provide the warning signal 114 when the bearing 106 as been worn down to a specified amount. In another preferred embodiment of the invention the tool head 102 can also comprise a sensor 116 (FIG. 1 and FIGS. 25-27) which is preferably removably mounted within the encasement 108 and is coupled to the bearing 106 and operates as a pressure or force sensor. The sensor 116 is also coupled to the control system 112 that monitors and/or records the force being applied by the burnishing tool to the surface of the work piece by the rolling element 104.

Figure 2:
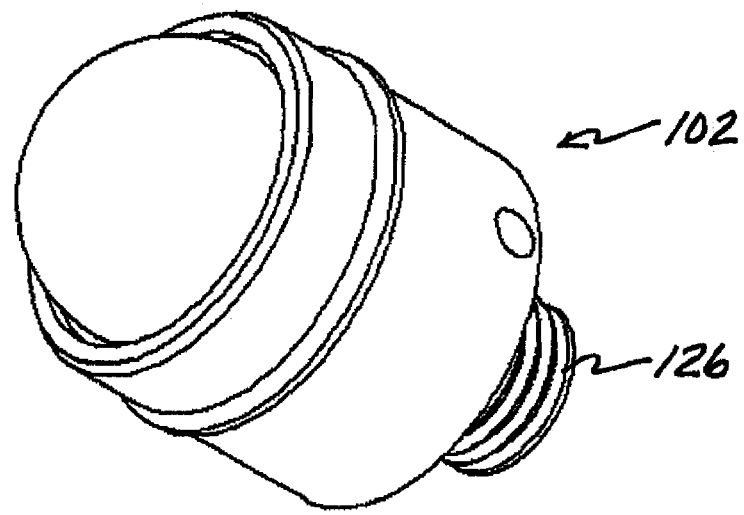
FIG. 2 is a schematic perspective illustration of a preferred embodiment of the tool head of the burnishing tool of the subject invention and showing a spherical shaped rolling element or ball.
Figure 3:
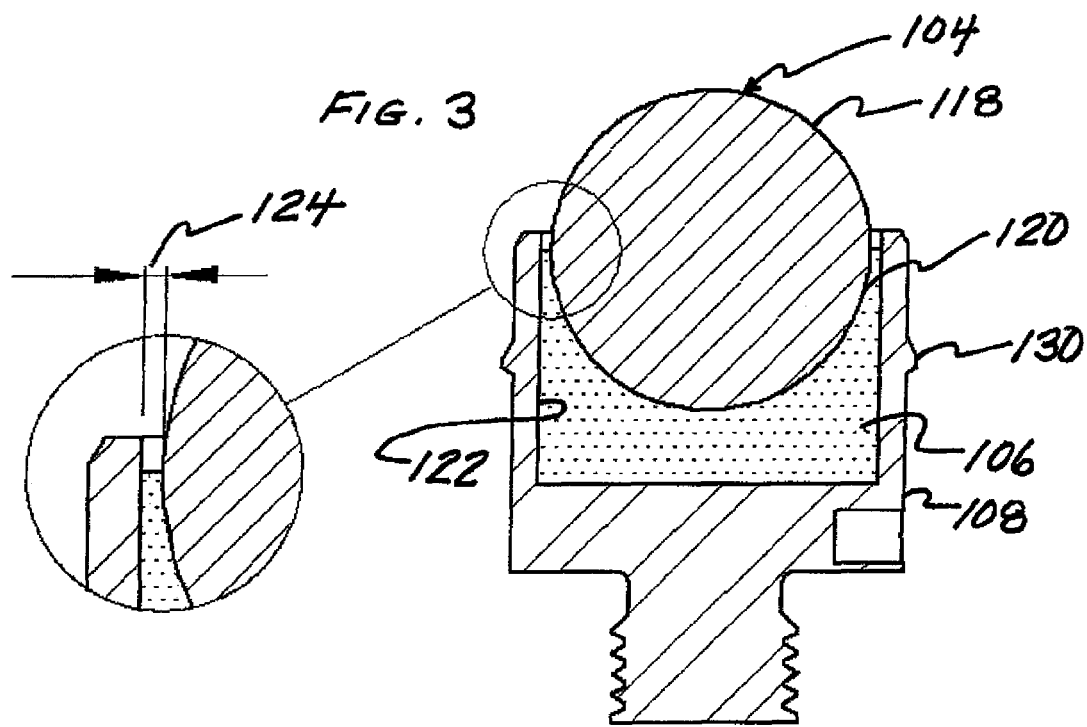
FIG. 3 is a side cross-sectional view of the tool head of FIG. 2.

Referring to FIGS. 2-3, the rolling element 104, in this case is a spherical shaped ball, supported by the bearing 106, that has a seat (bearing surface) that is machined, pressed, or otherwise formed to conform exactly to the shape of the surface 118 of the rolling element, 104. The bearing 106 is in turn blanketed by a ridged encasement 108, fabricated from metal or other suitable material, such that no voids exist between the bearing seat 120 of the bearing 106, the surface 118 of the rolling element 104 and the inner surface 122 of the encasement 108. It should be understood that the thickness of the encasement is easily determined by the size and shape of the tool head, the size and shape of the rolling element, the process to be performed, and the material forming the encasement and is such that the encasement provides a structure having sufficient thickness along the inner surface of the bearing to provide a rigid support throughout the burnishing operation.

In a preferred embodiment of the present invention, the bearing is formed from a polymeric bearing material, preferably a self-lubricating polymer and/or a low coefficient of friction polymer, such as a polytetrafluoroethylene (PTFE) based resin. It has been found that PTFE and PTFE based resins provide a low coefficient of friction thereby minimizing the force needed to move (roll) the rolling element along the surface of the workpiece as well as minimizing the heat developed by friction during use. The reduced friction and heat production allow greater processing speeds to be achieved. It should be understood that the selection of the bearing material is not limited to PTFE, but may include a wide range of suitable polymeric materials, many of which are commonly used as bearing materials for rotating shafts, such as ultra-high-molecular-weight polyethylene (UHMWPE or UHMW) material and resins as well as other self lubricating polymer or polymer resins. A primary requirement of the selection of the bearing material is that the friction and heat generated during the burnishing process will be maintained within acceptable limits for the particular application as well as having the strength to withstand the reactive force being applied by the rolling element against the surface of the work piece. In another preferred embodiment of the invention, the bearing material is chosen such that it is chemically inert, so that even minute particles of the bearing material that might transfer onto the surface of the rolling element and to the surface of the work piece will not cause contamination in applications such as medical implants or nuclear components.

In another preferred embodiment of the invention, the bearing is formed from a thermoplastic polymer material that can be formed into the desired configuration by heating and pressing into the exact shape required to support the rolling element and completely set into and fill the voids along the inner surface of the encasement.

In a preferred embodiment of the present invention, as illustrated in FIGS. 2-3, the encasement 108 supports the bearing 106. The encasement 108 is formed from a metal or other strong and rigid material, such as a stainless steel, tungsten, brass or other such tool material that can support the weaker bearing 106 and not deform during the burnishing operation. The use of a relatively strong and rigid material to form the encasement 108 supporting the bearing 106 has been found to allow for an increase in the load bearing capacity of the bearing 106 by preventing, or severely limiting, deformation of the bearing 106 under load. It has also been found that the relatively strong and rigid material forming the encasement 108 greatly increases the effective compressive strength of that bearing 106, causing it to behave much as a hydrostatically confined fluid, resisting deformation under load. This feature of the invention has been found to greatly extend the load bearing capacity of the bearing 106, surprisingly even exceeding that of a hydrostatic bearing in sizes less than nominally about 0.5 inch diameter spherical rolling elements, or about 0.2 square inch surface area supported by the bearing material.

During use, the burnishing tool 100 operates to move the burnishing head towards the surface 10 of the work piece W to be treated (step 1) until the rolling element 104 makes contact with the surface 10 (FIG. 1) and moves along the surface 10 (step 2) with sufficient force to produce the desired surface treatment to the surface, such as inducing a desired magnitude of residual stress along and within the surface of the work piece W. The burnishing force being applied is nominally on the axis of the tool such that the rolling element 104 is pressed into the bearing seat 120 (step 3). The rigid outer encasement 108 supports the softer polymeric bearing 106 by fully blanketing the inner surface of the bearing except at the narrow gap 124 formed between the rolling element 104 and the inner surface 122 of the encasement 108 (step 4). By maintaining the gap 124 sufficiently narrow, the viscoelastic polymeric bearing 106 is constrained from deforming other than by extruding through the gap 124, and is thus held under nearly hydrostatic loading conditions. The effective compressive strength of the bearing 106 has been found to increase as the gap 124 is reduced, as depicted graphically in FIG. 21, and is further discussed below. The compressive strength of prior art polymeric bearings that are not confined by the rigid encasement of the present invention have been found not to be sufficient for use as a burnishing tool.

As shown in FIG. 2, the tool head 102 includes a tool attachment 126, such as a rod, a threaded or bayonet attachment, conventionally used to attach a tool head 102 to a machine tool 110 (FIG. 1) or other mechanical equipment for positioning and moving the rolling elements across the surface of the work piece as directed by a control system 112.

Figure 6:
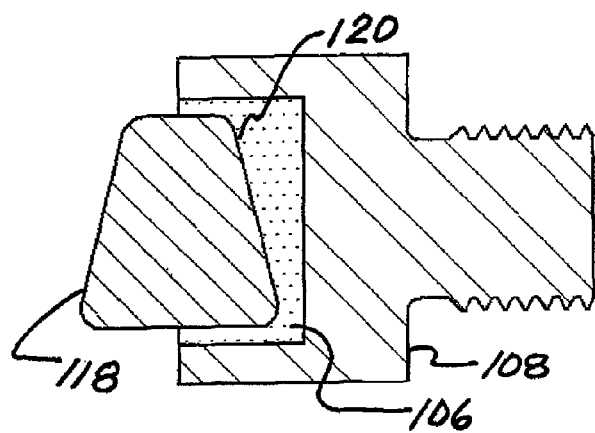
FIG. 6 is a schematic cross-sectional view of the tool head of FIG. 4 showing the conical shaped rolling element.
Figure 5:
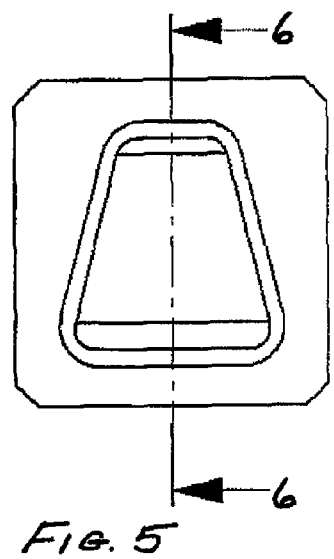
FIG. 5 is a top schematic view of the tool head of FIG. 4.
Figure 4:
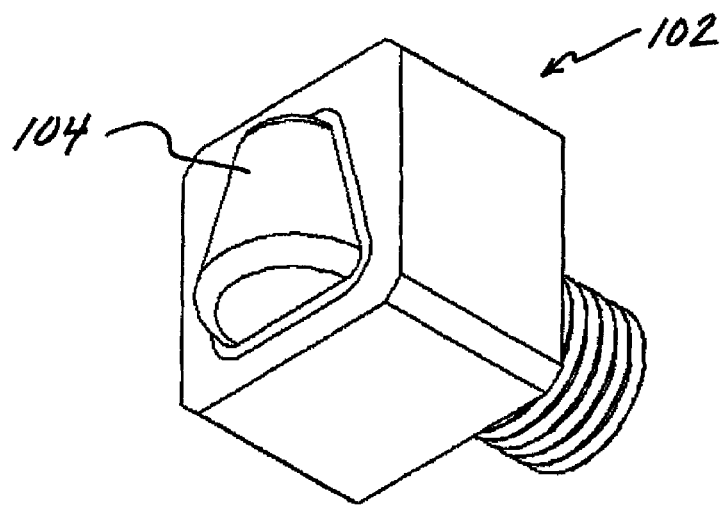
FIG. 4 is a schematic perspective illustration of another preferred embodiment of a tool head of the burnishing tool of the subject invention showing a conical shaped rolling element.

Referring now to FIGS. 4-6, in another preferred embodiment of the invention the tooling head 102 is shown wherein the rolling element 104 is in a conical shape, suitable for processing fillet radii or to create a range of contact pressure along the axis of the cone. The bearing seat 120 conforms to the outer shape of the rolling element 104 and is constrained by the rigid encasement 108. The small gap 124 between the rolling element 104 and the encasement 108 limits the deformation of the polymeric bearing 106, as described above.

Figure 8:
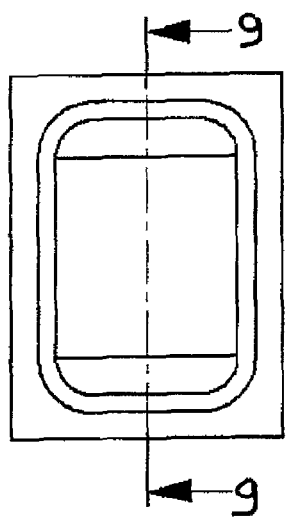
FIG. 8 is a top schematic view of the tool head of FIG. 7.
Figure 9:
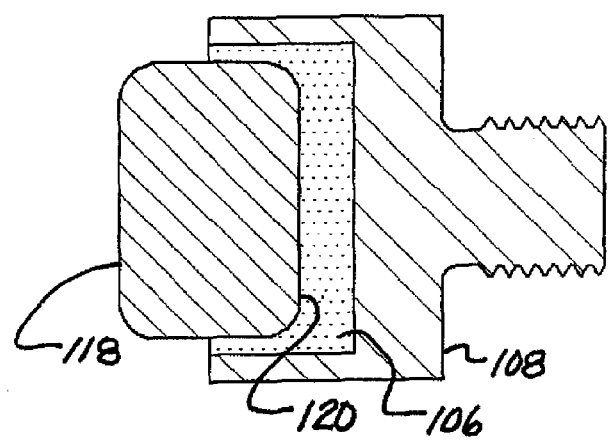
FIG. 9 is a schematic cross-sectional view of the tool head of FIG. 7.
Figure 7:
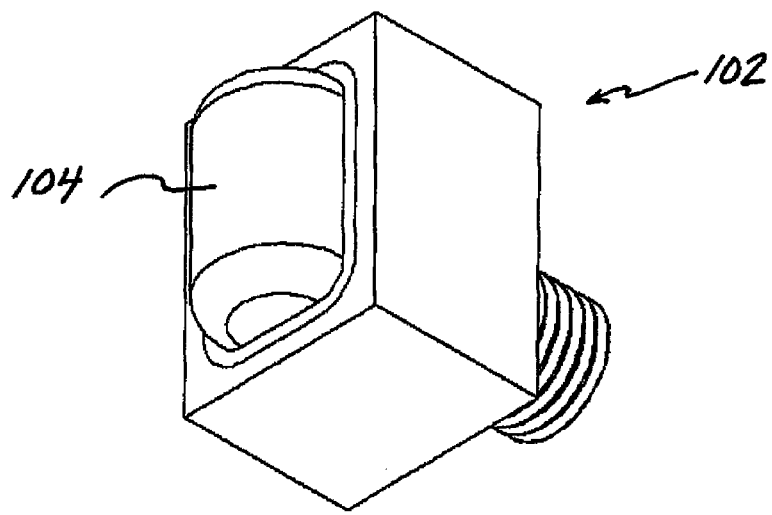
FIG. 7 is a schematic perspective illustration of another preferred embodiment of a tool head of the burnishing tool of the subject invention showing a cylindrical shaped rolling element.

Referring now to FIGS. 7-9, another preferred embodiment of invention the tooling head 102 is shown wherein the rolling element 104 is in a cylindrical shape, suitable for processing a wide surface area under uniform line contact with the roller surface. The bearing seat 120 conforms to the outer shape of the rolling element 104 and is constrained by the rigid encasement 108. The small gap 124 between the rolling element 104 and the encasement 108 limits the deformation of the polymeric bearing 106, as described previously, increasing the effective compressive strength of the bearing and increasing the range of load on the roller in service.

Referring now to FIGS. 10-12, another preferred embodiment of the invention, the tool head 102 is shown wherein the rolling element 104 is in an elliptical shape with the semimajor axis parallel to the contact surface of the work piece W (FIG. 1). The elliptical shaped rolling element 104 provides a range of tool radii that can be brought into contact with the work piece and a larger contact radius with more clearance than a spherical shaped rolling element. The bearing seat 120 conforms to the outer shape of the rolling element 104, and is constrained by the rigid encasement 108. The small gap 124 between the rolling element 104 and the encasement 108 limits the deformation of the polymeric bearing 106, as described previously, increasing the effective compressive strength of the bearing and increasing the range of load on the rolling element in service.

Referring now to FIGS. 13-15, in another preferred embodiment of the invention the tool head 102 is shown wherein the rolling element 104 is in an elliptical shape with the semi-minor axis parallel to the surface of the work piece. The elliptical shaped rolling element 104 permits access to process small fillet radii. The bearing seat 120 conforms to the outer shape of the rolling element 104, and is constrained by the rigid encasement 108. The small gap 124 between the rolling element 104 and the encasement 108 limits the deformation of the polymeric bearing 106, as described previously, increasing the effective compressive strength of the bearing and increasing the useful range of load on the rolling element in service.

Figure 16:
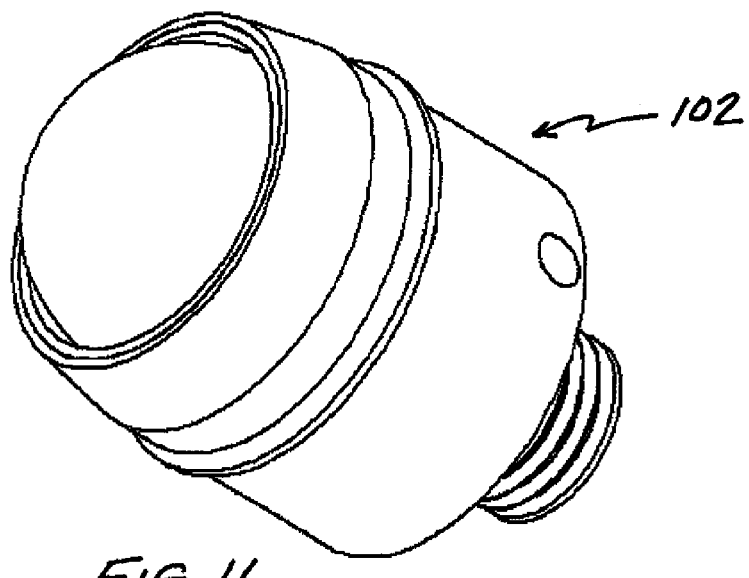
FIG. 16 is a schematic perspective illustration of another preferred embodiment of a tool head showing a spherical shaped rolling element with an encasement designed to increase the constraint on the bearing support as the processing load increases.
Figure 17:
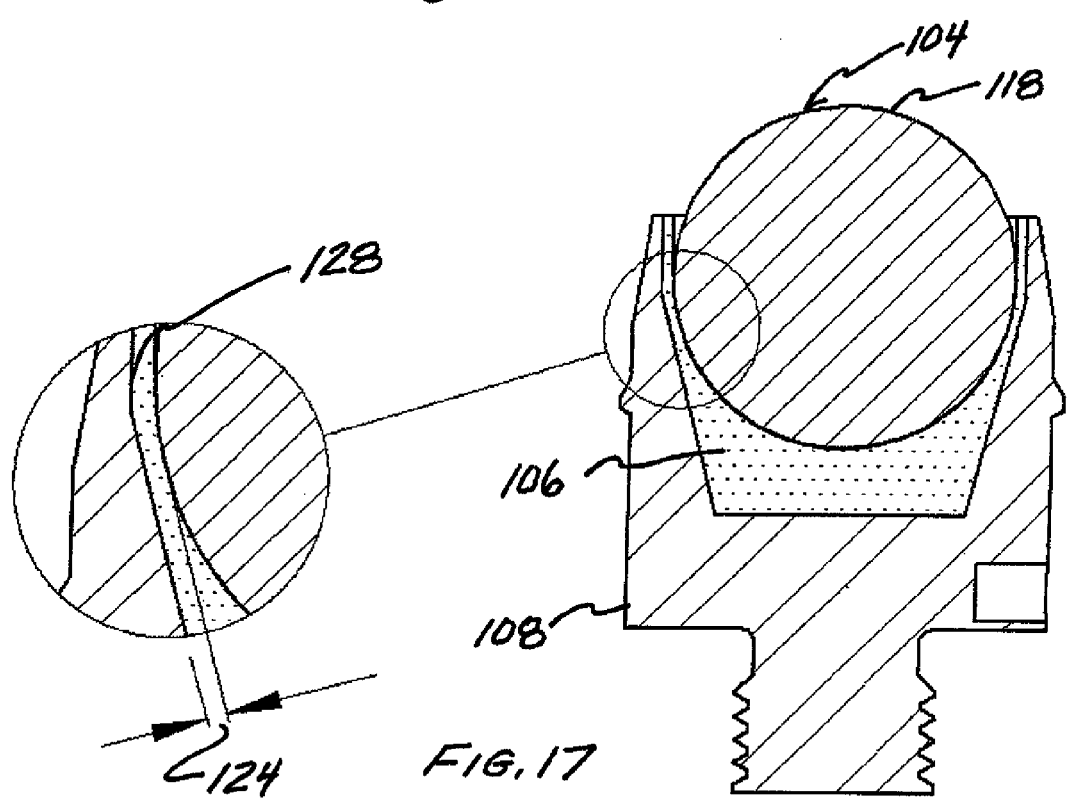
FIG. 17 is a side cross-sectional view of the tool head of FIG. 16.

Referring to FIGS. 16-17, in another preferred embodiment of the invention, the tool head 102 has a rolling element 104, and polymeric bearing 106 confined in an encasement 108 having a taper portion 128 such that the gap 124 through which the polymeric bearing 106 must deform under load diminishes in width as the rolling element 104 is forced into the bearing seat 120 as the processing load on the rolling element 104 increases. It is understood that the example of a spherical rolling element depicted in FIG. 16-17 is not meant to limit tools that employ a tapered gap. The rolling elements in tools employing the tapered gap of the current invention may be spherical, cylindrical, elliptical, or any other suitable solid of revolution as described previously. The bearing seat 120 conforms to the outer contour of the rolling element 104, and is constrained by the rigid encasement 108. The small gap 124 between the rolling element 104 and the encasement 108 is designed to become narrower as force is applied to the rolling element 104, increasing the constraint on the bearing 106 and thus increasing the compressive load bearing capacity to a greater extent than the generally constant gap 124 design previously described. The degree of internal taper of the encasement can be adjusted to give a controlled rate of decrease in the gap 124, and thus the rate of increase in confinement of the bearing 106, with increasing force on the rolling element 104. In another preferred embodiment of the burnishing tool, the tool head 102, the bearing 106, and encasement 108 operate together to retain the rolling element 104 without the need of a cap or other means of retention. The encasement 108 and bearing 106 extend to beyond the center of rotation of the rolling element 104, and the encasement 108 is formed to a smaller dimension so that the rolling element 104 is held in position in the tool head, without the need for a separate cap or retention device. It should be understood that in a preferred embodiment of the invention the encasement can include a retainer 130 (FIG. 1) that conventionally permits a conventional rolling element retainer cap 132 (FIG. 28) to be attached to the encasement for maintaining the rolling element within the tool head and against the bearing. The bearing seat 120 conforms to the outer contour of the rolling element 104 and the encasement 108, as previously disclosed. It is understood that the example of a rolling element 104 having a spherical shape as shown is not intended to limit the invention, and any suitable solid of revolution may be substituted as the rolling element and the appropriate shaped rolling element retainer cap can be employed.

Figure 19:
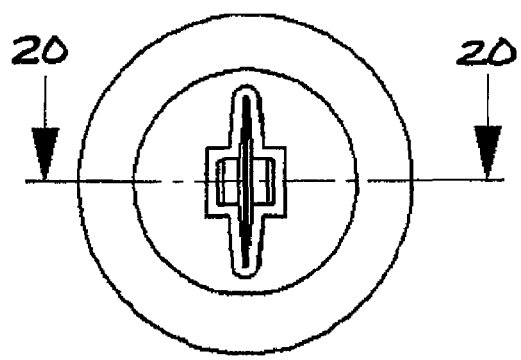
FIG. 19 is a schematic top view of the burnishing tool of FIG. 18.
Figure 18:
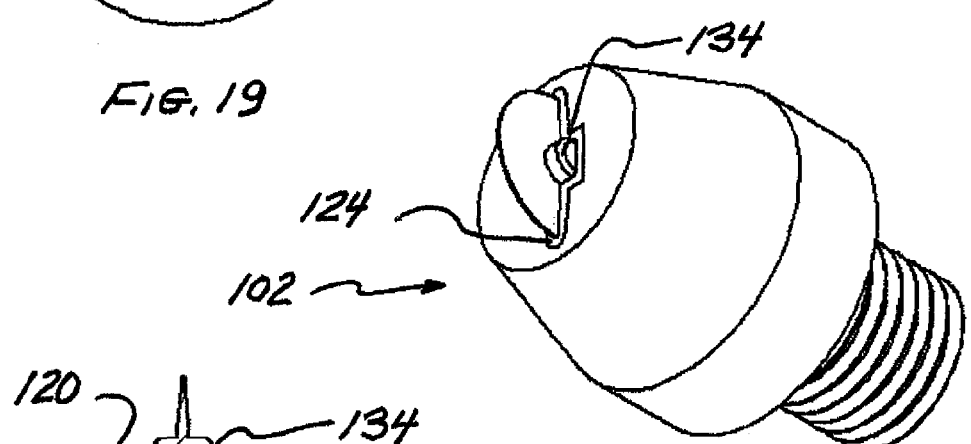
FIG. 18 is a schematic perspective illustration of another preferred embodiment of a tool head showing a rolling element having a narrow wheel and axel configuration effective for increasing the surface area in contact with the bearing.
Figure 20:
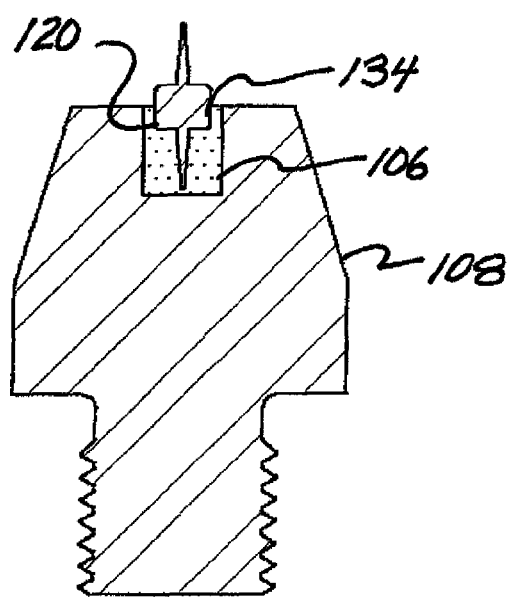
FIG. 20 is a side schematic cross-sectional view of the tool head of FIG. 18.

Referring to FIGS. 18-20, in another preferred embodiment of the burnishing tool of the subject invention, the tool head 102 is shown having a rolling element 104 in the shape of a solid of revolution, in this case a narrow disk, that incorporates an axel feature 134 that increases the surface area of the rolling element 104 in contact with the support bearing 106 to allow greater load bearing capacity. In the example shown, which is not intended to limit the range of rolling elements which can be employed in the invention, the shape of a narrow disk is suitable for burnishing very small fillet radii, tread roots, and similar small features. The bearing seat 120 conforms to the outer contour of the rolling element 104 and is constrained by the rigid encasement 108 as described above. The small gap 124 between the rolling element 104 and the encasement 108 limits the deformation of the polymeric bearing 106, as described previously, increasing the effective compressive strength of the bearing and increasing the range of load on the roller in service.

Figure 21:
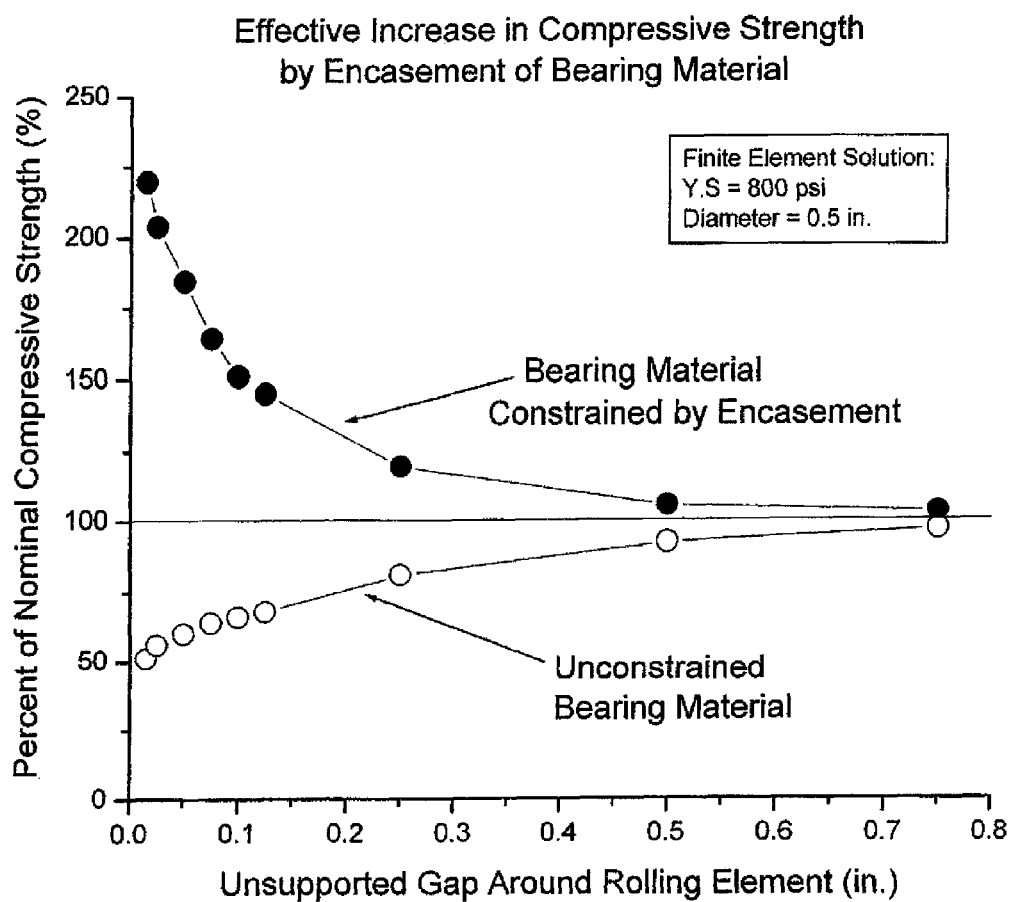
FIG. 21 is a graph illustrating the increase in the effective yield strength calculated by finite element modeling of one preferred embodiment of the burnishing tool having a bearing formed from polymeric material (PTFE), and which is further constrained by reducing the gap between the rolling element and the encasement.

FIG. 21 illustrates a primary feature of the preferred embodiments of the invention, the increase in the effective compressive strength of the polymeric bearing as the gap of unsupported bearing material is reduced. The example shown in FIG. 21 is based upon a finite element solution for the onset of yielding under a 0.5 inch diameter piston for a bearing material with a nominal compressive yield strength of about 800 psi. Solutions with and without constraint by a surrounding rigid encasement are shown. It has been found that the effective compressive strength increases significantly for a gap width of less than about 0.1 inch. Preferably the gap width is less than about 0.025 inches and more preferably less than about 0.002 inches. At the minimum of 0.025 inch plotted, the compressive strength of the constrained bearing approaches about 2.5 times the nominal, and fully about 5 times the strength of the unconstrained bearing material of the same diameter. The gap of an unsupported bearing is not limited to the value of about 0.025 inches as shown, but may be further reduced as required, limited only by the available manufacturing tolerances. It is clear from the solution shown that as the effective compressive strength of the bearing will continue to increase, without practical limit, as the gap is reduced to approach total confinement, and the incompressible bearing material approaches purely hydrostatic loading.

Referring now to FIGS. 22-24, an embodiment of the tool head 102 of the subject invention is shown having a complex rolling element 104 of the type made possible by the present invention is illustrated. The rolling element 104 is in the shape of a solid of revolution formed with two different radii 136 and 138 that may be sized, for example, to process features of different dimensions on a work piece. The bearing seat 120 conforms with and supports the rolling element 104. The bearing 106 is supported by the rigid encasement 108. The bearing 106 is confined on all surfaces except in the small gap 124 that is sized to increase the effective compressive strength of the bearing to the intended load bearing capacity of the tool.

It should be understood that the various embodiments of the rolling elements 104 as shown can be held in contact with their respective bearing seats 120 by various methods such as by extending the encasement beyond the widest point of the rolling element as previously described; by use of a conventional retaining ring as previously described; by use of rotating shafts; or by any other conventional means for securing the rolling element in the socket of a tool head.

Figure 28:
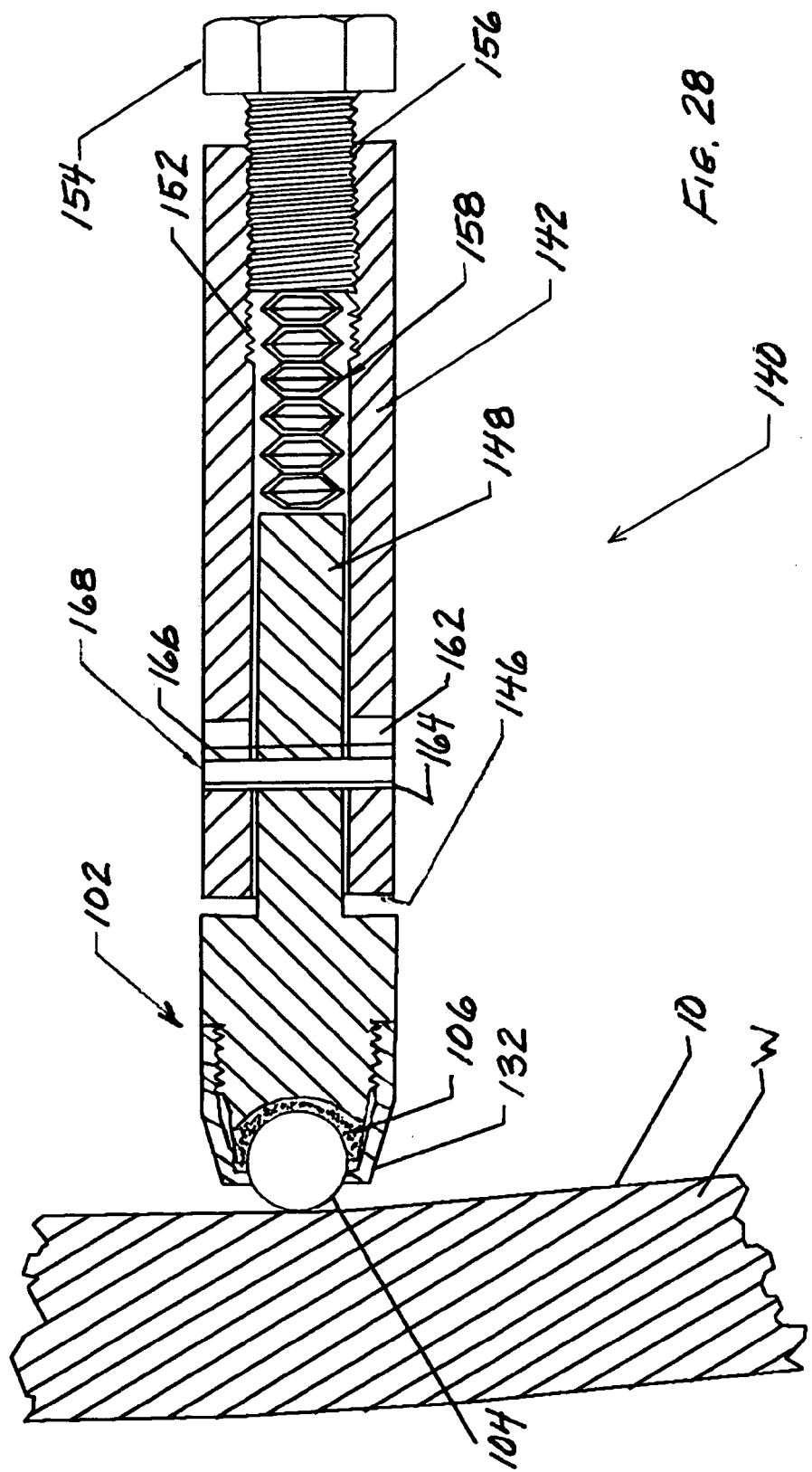
FIG. 28 is a longitudinal cross-sectional view of a preferred embodiment of the socket support of the burnishing tool of the subject invention.

Referring to FIG. 28, the tool head 102 is shown having a rolling element 104 adapted to be attached by the tool attachment 126 to the machine tool 110. The machine tool 110 includes a tool head support 140 having a slide 142 comprising a longitudinally extending bore 144 with a first end 146 for receiving a rod member 148 which is attached to the tool attachment 126 of the tool head 102. A second end 150 of the bore 144 has a threaded inner surface 152. Received on the threads is a pressure adjustment screw 154 having an inner end 156 which is coupled to the rod member 148 through a mechanical spring means 158 such as a Belvil or compression spring or other like means. In order to lock the rod member 148 within the first end 146 of the bore 144, the outer peripheral surface 160 of the tool head support 140 is provided with first and second recesses 162 each having a radially extending aperture 164 which cooperate with a radially extending aperture 166 in the rod member 148 for receiving a lock pin 168. The recesses and lock pin configuration allows the tool head to expand or contract axially towards or away from the work piece while permitting the tool head to be easily attached or detached from the tool head support 140. However, other locking means such as detents, locking screws, and the like may also be utilized for retaining the rod member within the bore of the slide. It should be understood that the slide 142 has a generally rectangular cross-section to permit it to be easily mounted to a fixture of any particular description for controlling the movement of the tool head, for example within the recess of a conventional lathe tool post. However, other cross-sectional configurations, such as a circular cross-section, may also be selected. Further, it will be apparent to one skilled in the art that the socket support may be provided with a flange or other known means for mounting onto a conventional tool support fixture.

To understand how the parts above described are interrelated, the operation of the burnishing tool will now be described. The tool head is advanced towards the surface of the work piece until the forward most tip of the rolling element makes contact with the work piece surface (step 5). The proper pressure or compressive force to be applied to the surface of the work piece during the burnishing operation is provided by carefully tightening or loosening the adjustment screw of the socket support (step 6). Because the tool head is coupled to the adjustment screw through the spring means, tightening or loosening the adjustment screw will cause the spring means to compress or expand axially and will correspond to a given force exerted on the surface of the work piece by the rolling element. Further, because the rolling element is coupled through a spring means having known spring characteristic, slight variations in the workpiece surface will be absorbed by the spring means without affecting the burnishing operation. Accordingly, the pressure or the compressive force exerted on the surface of the workpiece by the rolling element can be precisely regulated. The burnishing operation is then controlled by the control system which controls the movement of the work piece or the movement of the tool head (step 7).

Figure 29:
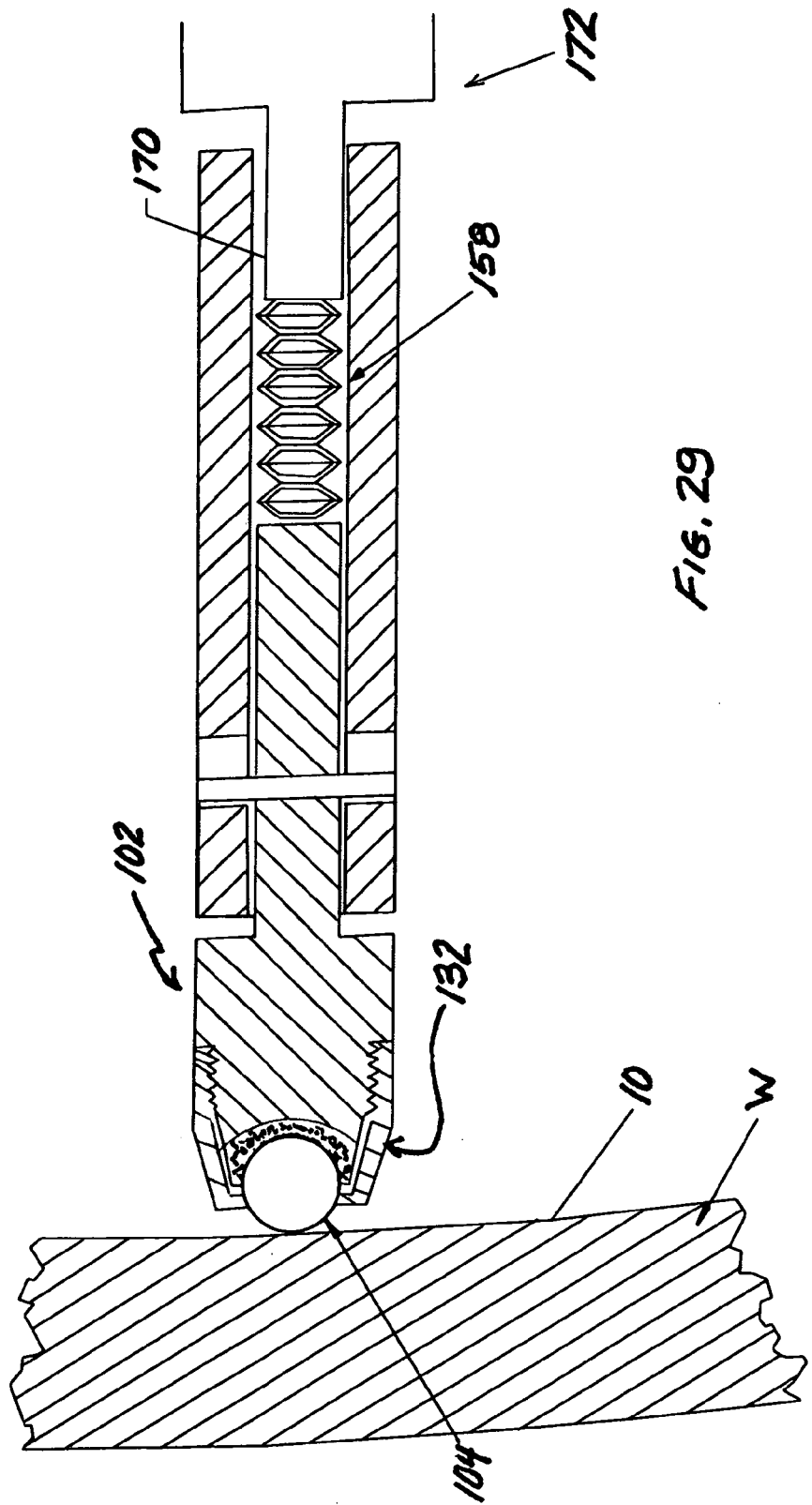
FIG. 29 is a longitudinal cross-sectional view of another preferred embodiment of the socket support of the burnishing tool of the subject invention.

In another preferred embodiment of the invention as shown in FIG. 29, the adjustment screw 154 (FIG. 28) is replaced by a follower rod 170 of a cylinder piston assembly 172. By moving the follower rod 170 inwardly or outwardly, the spring tension is correspondingly increased or decreased and the pressure or compressive force applied by the rolling element to the surface of the workpiece is correspondingly adjusted.

It should now be understood that the rolling elements, as shown above, are not limited to spherical rollers (balls) like the conventional hydrostatic bearing tools, but can utilize conical, oblong elliptical, cylindrical, and small wheel-and-axel rollers, as described in detail above.

It should also now be apparent to one skilled in the art that the burnishing tool of the subject invention can be used to replace burnishing tools using conventional hydrostatic fluid bearings or an axel rotating on mechanical bearings for many burnishing applications. It should also now be apparent that the burnishing tool of the subject invention eliminates the need for apparatus to pressurize, deliver and return hydrostatic bearing fluid into and out of the tool head. Thus, the bulk and complexity of an existing wheel tool with an axis supported by mechanical ball or roller bearings is eliminated, minimizing interference with the work piece and increasing the load bearing capacity. Further, the polymeric material forming the bearing that supports the rolling element and which is further supported by intimate contact with a metallic or other rigid encasement operate to prevent plastic deformation or creep of the polymeric bearing, allowing the bearing to support higher loads than would otherwise not be possible.

It should also be apparent to one skilled in the art, the present invention also eliminates the need to deliver, control, and recover hydrostatic bearing fluid, allowing it to be used in a wider range of applications. Elimination of the supporting fluid is necessary for applications such as burnishing of medical implants or nuclear power components where chemical contamination of the surface cannot occur. Applications of burnishing at temperatures and in environments that may cause freezing or evaporation of the supporting fluid, such as processing portions of aircraft structures in hostile environments are now made possible with the present invention. The elimination of the fluid also allows for burnishing in areas that would otherwise be impossible to reach due to the fluid transport cables.

Figure 30:
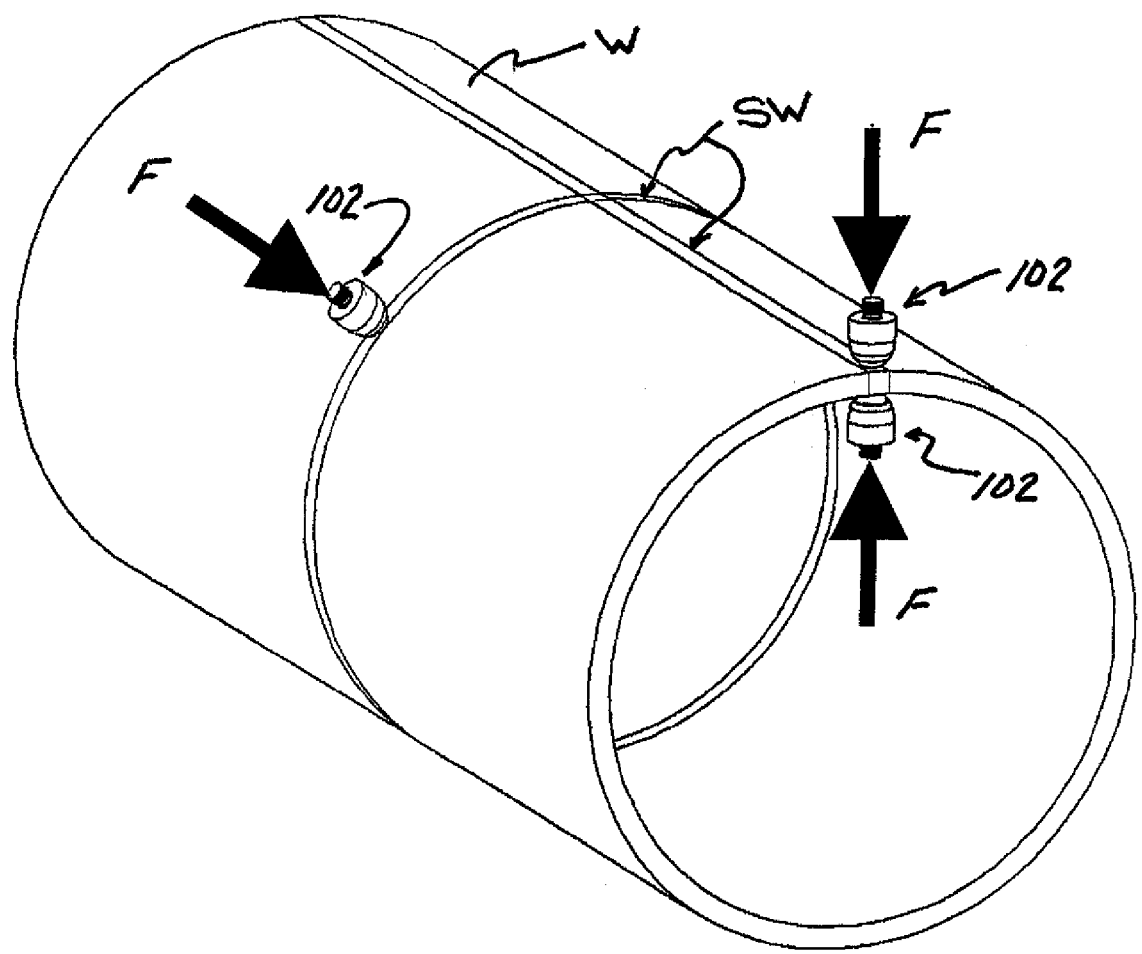
FIG. 30 is an isometric schematic view of a pipe with a longitudinal and a butt weld being burnished on the outside and inside simultaneously using a preferred embodiment of the tool head shown in FIG. 26.
Figure 31:
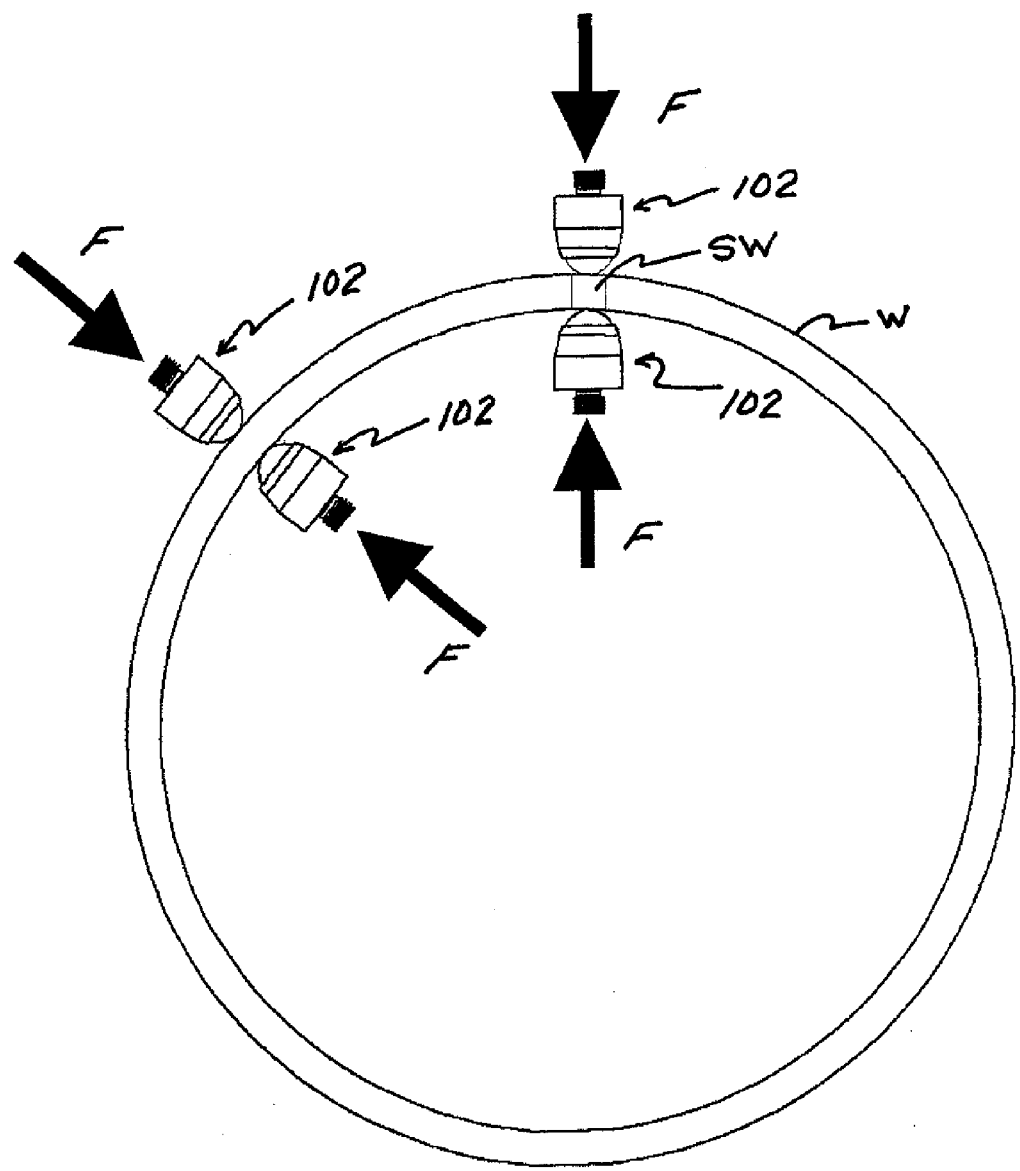
FIG. 31 is a schematic side view showing the application in FIG. 30, displaying tool heads being used in tandem.

It should also now be apparent to one skilled in the art that elimination of the supporting fluid allows the burnishing tool of the subject invention to operate and perform a burnishing operation under or in contact with a fluid, including but not limited to, being completely submerged. For example, this applies directly to piping or a tank that could not or preferably not drained during the burnishing process. Further, the burnishing tool of the subject application eliminates or significantly reduces the problem of contaminating the contents of the pipe or tank with burnishing fluid or the residue of burnishing fluid. As shown in FIG. 30 and FIG. 31, a workpiece such as a pipe W or other container having one or more welds SW are being burnished with a preferred embodiment of the tool head 102. The burnishing process is performed with a force F applied by a control system 112 (FIG. 1) such as described herein. As shown, in a preferred embodiment of the invention and depending on the desired compressive stress pattern to be induced into the workpiece, a pair of burnishing tools 102 can be utilized such that burnishing force F is applied in opposite directions with equal or different levels of force. It should now be apparent that the use of the burnishing tool of the subject invention permits various apparatus to be utilized for directing and moving the burnishing head along the surface of the workpiece to be burnished, such as a pipe or container, without the need for delivering a hydraulic fluid to the burnishing head.

It should also now be understood that the burnishing tool of the subject invention can be positioned either manually or by use of a control system, such as by use of a computer numerical control (CNC) machine tool or robot as know in the art, with a control programmed to position the tool and vary the force of burnishing. It should also now be understood that the burnishing heads illustrated above are not limited to the particular forms illustrated above, but that such forms described are for use as illustrative examples of the subject invention and that a variety of other forms including, but not limited to, a single point, caliper or other configurations known in the art can be adapted and used along the lines of the subject invention.

As fully described above, the present invention comprises a polymeric bearing material blanketed by a metal or other strong material encasement that both supports the weaker polymer bearing, and defines the geometry of the burnishing tool tip. The encasement has been found to increase the load bearing capacity of the bearing by preventing, or severely limiting, deformation of the bearing under load. It has also been found that the encasement greatly increases the effective compressive strength of the bearing, causing it to behave much as a hydrostatically confined fluid, resisting deformation under load. This feature of the invention greatly extends the load bearing capacity of the polymeric bearing, and it has surprisingly been found that it exceeds that of a hydrostatic bearing in sizes less than nominally about 0.5 inch diameter spherical rolling elements, or about 0.2 square inch surface area.

It should also be understood that the encasement shown and described above functions such that as force is applied to the rolling member, it further increases the load bearing capacity as the working load increases. Further, the cross sectional area of the bearing defined by the surrounding encasement can be tapered so that as force is applied to the tool and the rolling element in pressed into the bearing, the cross sectional area of any unsupported portion of the bearing in contact with the rolling element is reduced. Reducing the cross section through which the material forming the bearing must flow in order to plastically deform increases the constraint on the bearing, approximating hydrostatic loading. The compressive strength of the bearing is then effectively increased as the burnishing force increases.

It should also now be understood that the rigid encasement supporting the bearing which may be fabricated from metal, ceramic, composite, or other material sufficient to adequately support the bearing, can extend over more than half of the rolling element surface. The angular range over which the processing force can then be applied to the rolling element is then greatly extended over that possible with currently available hydrostatic or conventional ball or roller bearing tools.

While the method and apparatus described constitutes preferred embodiments of the invention, it is to be understood that the invention is not limited to the precise method and apparatus, and that changes may be made therein without departing from the scope of the invention which is defined in the appended claims.

What is claimed is:

1. A method of burnishing comprising the steps of:
    performing a burnishing operation along at least a portion of the surface of the work piece using a burnishing tool comprising at least one tool head having a rigid encasement supporting a bearing formed from a softer polymer or polymer based resin material, and a rolling element supported by the bearing; and
    moving the rolling element along the at least a portion of the surface with sufficient force to produce a desired magnitude of residual stress along and within the surface of the work piece.

2. The method of claim 1 wherein the polymer is polytetrafluoroethylene or polytetrafluoroethylene based resin.

3. The method of claim 1 wherein the polymer is an ultra-high-molecular-weight polyethylene or ultra-high-molecular-weight polyethylene based resin.

4. The method of claim 1 wherein the polymer is a thermoplastic material having a low coefficient of friction and having sufficient compressive strength to support the rolling element during a burnishing operation.

5. The method of claim 1 where the rigid encasement is fabricated from a metallic, ceramic, or composite material.

6. The method of claim 1 wherein the rolling element has the shape of a solid of revolution.

7. The method of claim 6 wherein the rolling element has the shape of a sphere, a cone, a cylinder, or an ellipse.

8. The method of claim 7 wherein the rolling element includes an axes feature that operates to increase the surface area of the rolling element in contact with the bearing.

9. The method of claim 4 wherein the rolling element has the shape of a solid of revolution that conforms to the geometry of the work piece having at least one point of contact with the work piece.

10. The method of claim 1 wherein said bearing is supported by the encasement such that the stress in the bearing approximates hydrostatic loading when force is applied to the rolling element.

11. The method of claim 1 wherein said burnishing tool includes a gap formed between the rolling element and the encasement wherein the gap is sufficiently narrow such that the bearing is constrained from deforming other than by extending through the gap.

12. The method of claim 11 wherein the gap is less than about 0.25 inches wide.

13. The method of claim 11 wherein the gap is less than about 0.025 inches wide.

14. The method of claim 11 wherein the gap is less than about 0.002 inches wide.

15. The method of claim 11 wherein the gap becomes smaller in width as the rolling element is forced against the bearing during a burnishing operation.

16. The method of claim 11 wherein the encasement has a taper portion such that the width of the gap diminishes as the rolling element is forced into the bearing during a burnishing operation.

17. The method of claim 1 wherein the burnishing tool further comprises a sensor for providing a warning signal when the rolling element is near or begins to seize during the burnishing operation.

18. The method of claim 1 wherein the burnishing tool further comprises a control system coupled to a machine tool and wherein the control system operates to direct the burnishing operation.

19. The method of claim 1 wherein at least a portion of the burnishing operation is performed while at least a portion of the burnishing tool is submerged in a fluid.

20. The method of claim 1 wherein the work piece is a pipe.

* * * * *